Dec. 20, 1938.  C. M. BOLICH  2,141,079
STORAGE BATTERY FILLING DEVICE
Filed April 1, 1937
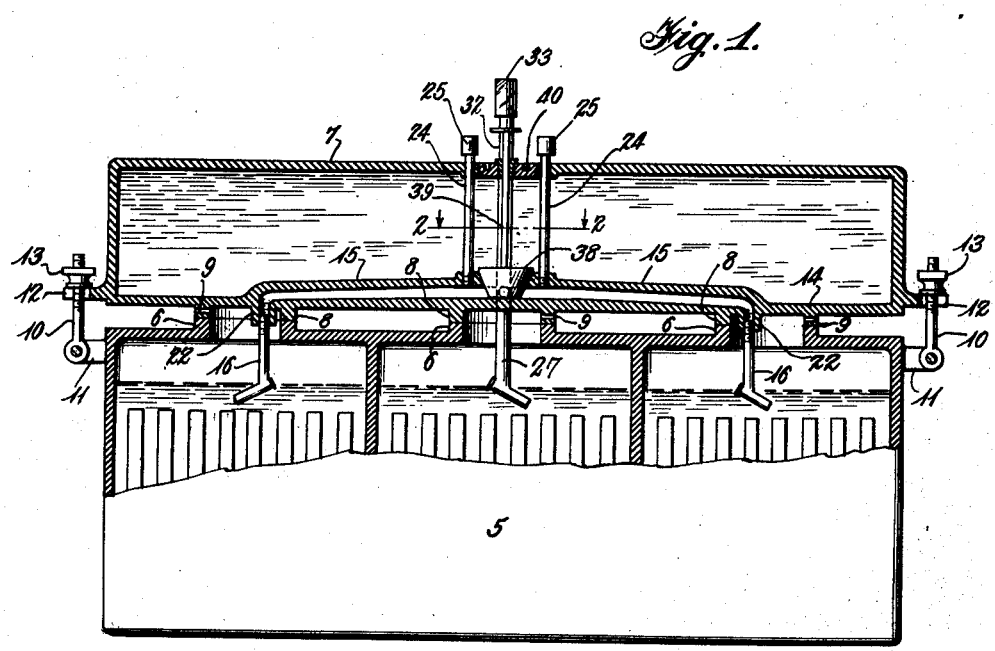
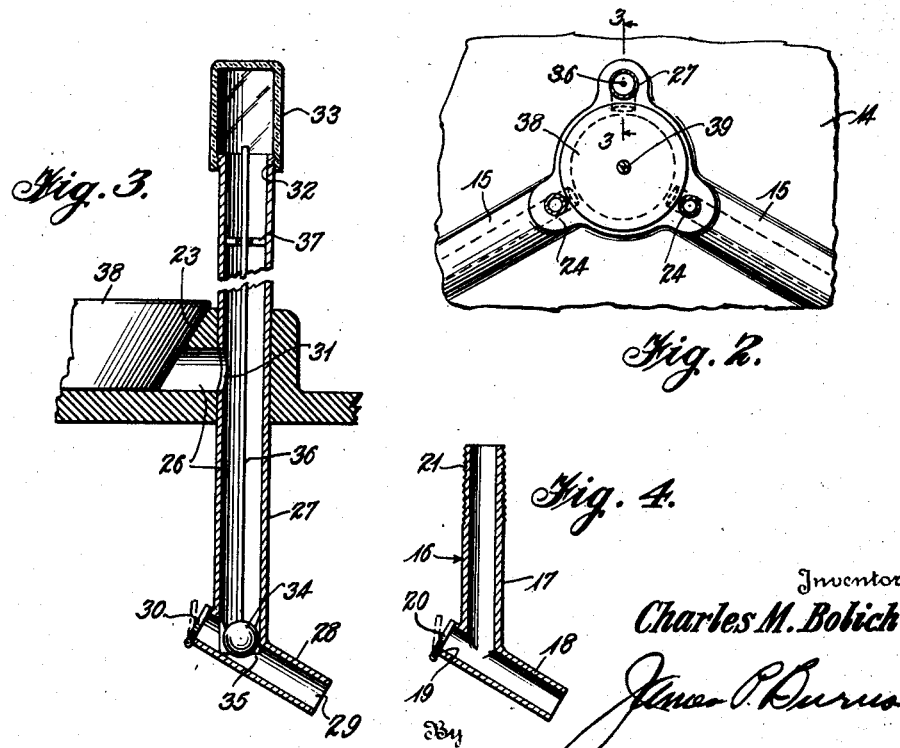
Inventor
Charles M. Bolich
By James P. Burns
Attorney Patented Dec. 20, 1938

2,141,079

UNITED STATES PATENT OFFICE 2,141,079

STORAGE BATTERY FILLING DEVICE

Charles M. Bolich, Allentown, Pa.

Application April 1, 1937, Serial No. 134,413

3 Claims. (Cl. 136—162)

This invention relates to new and useful improvements in devices for supplying storage batteries with distilled or other purified water suitable for such use.

The primary object of the invention is to provide a device which is adapted to be rigidly mounted on the top of a conventional storage battery and to function in response to initiating manual control to supply the various cells of the battery with water up to the desired level and to automatically stop the feeding of said water when such level has been reached.

A further important object of the invention is to provide a device of the above mentioned type which will enable one to test the specific gravity of the solutions in the various cells without necessitating removal of the water supplying device and while the cells are out of communication with the water chamber of said device.

Another object of the invention is to provide means which will act as a check on the level to which water is supplied to the battery cells by the aforementioned automatically acting control.

Other objects and advantages of the invention will be apparent during the course of the following description.

In the accompanying drawing forming a part of this specification and in which like numerals are employed to designate like parts throughout the same:

Figure 1 is a partial side elevational view and partial vertical sectional view of a conventional storage battery with the water supplying device embodying this invention properly associated therewith;

Figure 2 is a fragmentary transverse sectional view of a portion of the mechanism and taken on line 2—2 of Figure 1;

Figure 3 is a fragmentary vertical sectional view taken on line 3—3 of Figure 2; and Figure 4 is a detail longitudinal sectional view of a portion of the device illustrated in Figure 1.

In the drawing, wherein for the purpose of illustration is shown the preferred embodiment of this invention, the numeral 5 designates in its entirety what is intended to be a conventional storage battery having any suitable number of cells. Specifically, Figure 1 discloses a storage battery having three cells. Each cell has the conventional upstanding flange 6 in its top wall and through which it is customary to manually supply the various cells with distilled water, or the like, and to test the specific gravity of the solutions in the various cells to ascertain the same.

The battery filling or watering device embodying this invention includes a hollow body or receptacle 7 which is provided on its bottom wall with a plurality of depending annular flanges 8 which are of proper size to seat against the upper surfaces of the filler opening flanges 6 provided for the various storage battery cells. These flanges 6 and 8 are intended to tightly seat against each other so as to seal the filler openings for the battery cells. A small breather or vent opening 9 is formed in each one of the flanges 8 to permit discharge of air from the various battery cells as water is supplied thereto. For the purpose of mounting the water receptacle 7 on the top of the storage battery 5 and for causing the flanges 6 and 8 of these elements to tightly seat against each other, clamping bolts 10 are pivotally connected to ears 11 formed on the opposite end walls of the storage battery 5. These bolts 10 are adapted to be moved into the slots formed in ears 12, carried by the water receptacle 7, for permitting the clamping nuts 13 to be tightened down on the bolts 10 and against the slotted ears 12 for performing the function described.

As disclosed best in Figures 1 and 2, the bottom wall 14 of the receptacle 7 has formed therein two diverging passageways 15 which extend to the end cells of the storage battery 5. These passageways 15 include the detachable terminals or elbows 16. One of these elbows 16 is illustrated in detail in Figure 4 as including a vertical stem portion 17 and an angular foot portion 18. The lower end of the foot portion 18 is normally open. The heel end of the foot portion 18 is provided with an opening 19 which is controlled by the pivoted flap valve 20. This flap valve is intended to move between a closed position and a fully opened position. This fully opened position is intended to occur at a point just short of the perpendicular so that the valve normaly will be urged by the pull of gravity into its closed position against the opening 19 at the heel portion of the foot 18. The function performed by these flap valves 20 will be described at a later point. The elbows 16 are threaded at their upper ends 21 for connection with nipples 22 which depend from the bottom wall 14 of the receptacle 7 within the flanges 8 formed on said bottom wall.

The inner ends of the passageways 15 open through the wall of a conical valve seat 23 which is shown in detail in Figures 1, 2, and 3.

Extending upwardly through the interior of the receptacle 7 to terminate above the top surface of said receptacle are suitable pipe sections 24 which are closed at their upper ends by detachable caps 25. The lower ends of these pipe sections 24 are threaded in nipples formed in the upper walls of the passageways 15. The pipe sections 24, therefore, constitute upstanding extensions of the passageways 15.

Figures 2 and 3 disclose a third passageway 26 which communicates at its inner end with the valve seat 23 and includes an upstanding elbow member 27 which is formed with a lower foot portion 28. This foot portion is open at its lower end 29 and is provided with a pivoted flap valve 30 at its heel portion which is of the same construction and functions in the same manner as the flap valve 20 described in connection with Figure 4.

The elbow 27 has a port 31 which communicates with the horizontally extending branch of the passageway 26. The elbow 27 extends perpendicularly through the receptacle 7 to terminate above the same in a threaded extremity 32, to which is threaded a transparent cap 33.

A ball float 34 is positioned at the point of connection between the perpendicularly extending portion of the elbow 27 and the foot 28. Spaced fingers 35 function to restrict the downward movement of the float 34. A stem 36 extends upwardly from the float 34 through a loose guide 37 so as to terminate at its upper end within the transparent cap 33.

By inspecting Figure 2, it will be seen that the upstanding pipe sections 24 and the portion of the elbow 27 which projects upwardly through the interior of the receptacle 7 are grouped in such a manner as to function as a guide for a conical valve 38 which is adapted to be manually moved into and out of engagement with the conical valve seat 23. A stem 39 is connected to the conical valve 38 and extends outwardly of the top wall of the receptacle 7 through a detachable cap or plug 40 which is threaded in an opening formed in the top wall of the receptacle 7.

This storage battery filling or watering device will be described with reference to its mode of operation in the following manner:

The receptacle 7 is properly positioned upon the storage battery 5 and clamped in place by means of the bolts 10 and adjustable nuts 13. Prior to positioning the receptacle 7 on the storage battery, the various elbows 16 and 27 should be adjusted so as to locate their foot portions 18 and 28 at proper levels within the various battery cells. After properly positioning the receptacle, the cap or plug 40 is removed, with its valve 38, for feeding water into the chamber or compartment formed within the receptacle 7. With the valve 38 removed from the valve seat 23, the water supplied to the receptacle 7 will flow through the various passageways 15 and 26 into the battery cells.

The admission of water into the elbow portions of the passageways will cause the flap valves 20 and 30 to be raised from their seats. The water will continue to flow from the receptacle 7 into the various cells until the level of the water within the cells rises above the seats controlled by the flap valves 20 and 30. As the openings controlled by the flap valves are closed or covered by the water within the battery cells, further flow of water into the cells from the interior of the receptacle will cease. The receptacle 7 then may be completely filled with water and the cap or plug 40, with its valve 38, returned to the opening in the top wall of the receptacle. The valve 38 will be guided into engagement with the valve seat 23 by the pipe sections 24 and the upstanding portion of the elbow 27.

It will be appreciated that the level of the water in the central battery cell will cause the ball float 34 to be elevated, and this raising of the float will be indicated by the level of the upper extremity of the float rod 36. The position of this upper extremity of the rod may be viewed through the transparent cap 33.

After the battery has remained in service for a suitable length of time to necessitate feeding additional water to the battery cells, it only becomes necessary for a person to lift the valve 38 from its seat by means of the rod 39 and, without disturbing the cap or plug 40, to permit water to flow from the interior of the receptacle 7 into the several battery cells. The opening in the heel portions of the various elbows 17 and 27 will function in the manner described above for permitting water to flow into the battery cells until a proper level is reached in each cell. It will be appreciated that the automatic stopping of the flow of water to each cell is controlled independently by its flap valve and associated opening.

It will be appreciated that the interior of the receptacle 7 is normally sealed so that a partial vacuum will be established above the water level therein as water is discharged from the receptacle into the various cells. Of course, if too great a vacuum were to be formed above the water within the receptacle 7, this water would not flow into the various battery cells. The openings controlled by the flap valves 20 and 30 in the various elbows, however, permit air to pass from the various battery cells up into the interior of the receptacle 7. However, as the openings controlled by the flap valves are closed or sealed by the water rising within the battery cells, this movement of air from the cells into the receptacle 7 ceases, and the vacuum condition above the water within the receptacle becomes such that no additional water will flow from the receptacle into the various battery cells. The vents or breather openings 9 permit air to be admitted into the various battery cells or to be discharged therefrom as the water level within the cells varies.

To enable the owner of a battery equipped with this watering or filling device to ascertain the specific gravity of the solutions within the various battery cells, the caps 25 and 33 may be removed to permit a hydrometer to be connected to the pipe sections 24 and the upper extremity of the elbow 27. The hydrometer, when connected to any one of these upstanding elements, may be employed to suck water from the respective battery cells and obtain a reading in the conventional manner.

When an ordinary bulb type hydrometer is attached, for instance, to the top of the pipe section 24, the small volume of air contained in the pipe 24, the passageway 15, and the pipe 16 will be drawn into the rubber bulb of the hydrometer thus forming a partial vacuum. This partial vacuum within the pipe 16 will cause the valve 20 to be tightly pressed against its seat by atmospheric pressure. This partial vacuum will also cause the electrolyte to rise in the pipe 16, through passageway 15 of pipe 24, and into the hydrometer for testing. The purpose of the valve 20 is to seal opening 19 when the suction is applied at 24 and the purpose of the lower port in the foot 18 is to permit withdrawal of the electrolyte in which this port is always submerged. Valve 30 functions in the same manner and serves the same purpose.

It will be appreciated that this battery filling or watering device is very beneficial where the storage battery equipped with the same is located under a floor board of a motor vehicle. A small opening may be provided in this floor board through which the upper ends of the pipe sections 24 and the upper extremity of the elbow 27 may extend. If this arrangement is not desired, the caps 25 and 33 may be located just below the floor board, and access to these caps may be had by removing a small cover for the floor board opening.

It is to be understood that the form of this invention herewith shown and described is to be taken as a preferred example of the same and that various changes in the shape, size, and arrangement of parts may be resorted to without departing from the spirit of the invention or the scope of the subjoined claims.

Having thus described the invention, what I claim is:

1. In a device of the type described, the combination with a storage battery having a plurality of cells of a water receptacle mounted on the storage battery, passageways leading from said receptacle to the interior of each of said battery cells, said passageways terminating in a pipe structure open at the lower end and having a port in the wall of the pipe structure above said open lower end, a valve adapted to close said wall port, single means for controlling communication between the receptacle and all of said passageways and for closing said passageways from each other, and conduits leading from each of said passageways to permit the withdrawal of electrolytes by suction.

2. In a device of the type described, the combination with a storage battery having a plurality of cells of a water receptacle mounted on the storage battery, passageways leading from the interior of said receptacle to the interior of each battery cell, said passageways terminating in a pipe structure open at the lower end and having a port in the wall of the pipe structure above said open lower end, a flap valve adapted to close said wall port, single means for controlling communication between the receptacle and all of said passageways and for closing said passageways from each other, and pipes leading from each of said passageways through said receptacle to the top thereof to permit withdrawal of electrolytes by suction.

3. In a device of the type described, the combination with a storage battery having a plurality of cells of a water receptacle mounted on the storage battery, passageways leading from said receptacle to the interior of each of said battery cells, single means for controlling communication between the receptacle and all of said passageways and for closing said passageways from each other, and conduits leading from each of said passageways upward through said receptacle to the top thereof to permit withdrawal of electrolytes by suction.

CHARLES M. BOLICH.